United States Patent [19]

Hill

[11] Patent Number: 4,468,235
[45] Date of Patent: Aug. 28, 1984

[54] HYDROGEN SEPARATION USING COATED TITANIUM ALLOYS

[76] Inventor: Eugene F. Hill, 11517 Bianca Ave., Granada Hills, Calif. 91344

[21] Appl. No.: 464,774

[22] Filed: Feb. 7, 1983

Related U.S. Application Data

[63] Continuation-in-part of Ser. No. 12,471, Feb. 15, 1979, abandoned.

[51] Int. Cl.$^3$ ............................................. B01D 53/22
[52] U.S. Cl. .......................................... 55/16; 55/158
[58] Field of Search .............................. 55/16, 74, 158; 75/175.5, 177; 423/246, 644, 645; 427/405; 428/570, 651, 652

[56] References Cited

U.S. PATENT DOCUMENTS

| | | | |
|---|---|---|---|
| 2,773,561 | 12/1956 | Hunter | 55/16 |
| 2,809,107 | 10/1957 | Russell | 75/67 |
| 2,926,981 | 3/1960 | Stout et al. | 316/25 |
| 2,962,123 | 11/1960 | Darling | 55/16 |
| 3,148,031 | 9/1964 | Vahldieck et al. | 55/16 |
| 3,155,467 | 11/1964 | Yamamoto et al. | 55/16 |
| 3,350,846 | 11/1967 | Makrides et al. | 55/16 |
| 3,381,366 | 5/1968 | Winter | 428/651 X |
| 3,622,303 | 11/1971 | Hill | 75/66 |
| 3,795,087 | 3/1974 | Kamei et al. | 55/16 |
| 4,153,484 | 5/1979 | Gamo et al. | 75/175.5 |
| 4,160,014 | 7/1979 | Camo et al. | 75/175.5 |
| 4,346,137 | 8/1982 | Hecht | 427/405 X |

FOREIGN PATENT DOCUMENTS

| | | | |
|---|---|---|---|
| 963548 | 7/1964 | United Kingdom | 75/175.5 |
| 1181220 | 2/1970 | United Kingdom | |

OTHER PUBLICATIONS

"Electrolytic Hydrogen in Beta Titanium" by John J. DeLuccia, Naval Air Development Center Report No. 76207-30, 6/10/76.
"Palladium Alloy Diffusion Units", by P. M. Roberts & D. A. Stiles, Platinum Metals Review, vol. 13, No. 4, 10/69.
Ullmans Encyklopadie Der Techischen Chemie, 4th ed. vol. 10, 1975, Verlag Chemie, Weinheim/Bergstr., pp. 257–268.
R. I. Jaffee et al., "The Science, Technology & Application of Titanium".
I. I. Kornilov, "Interaction of Titanium with Elements of the Periodic System", Pergamon Press, Oxford, pp. 407–421.

Primary Examiner—Robert H. Spitzer

[57] ABSTRACT

This invention relates to the separation of hydrogen from other fluids by contacting said fluids with a titanium alloy comprising about 13% by weight vanadium, about 11% by weight chromium, about 3% by weight aluminum, balance titanium, stabilized in the body centered cubic crystalline form, said alloy having at least one clean surface coated with a metal or alloy based on a member of the class consisting of palladium, nickel, cobalt, iron, vanadium, niobium or tantalum, and allowing hydrogen to permeate the coated alloy at a temperature between about 100° C. and about 500° C.

19 Claims, 5 Drawing Figures

PERMEATION OF HYDROGEN
FOR VARIOUS MATERIALS AT
ATMOSPHERIC PRESSURE

HYDROGEN SEPARATION USING COATED TITANIUM ALLOYS

FIELD OF THE INVENTION

This is a continuation-in-part of application Ser. No. 012,471 filed Feb. 15, 1979, now abandoned.

This invention relates to the separation of hydrogen from fluids. The word hydrogen is used generically for all three hydrogen isotopes; hydrogen whose chemical symbol is $H_2$, deuterium, D, and tritium, T. In practicing this invention the fundamental behavior of these isotopes is nearly identical. Hydrogen separation as described in this invention is accomplished by the use of a class of titanium alloys which have been stabilized in the body centered cubic crystalline form by the addition of suitable metallic elements and whose surface impedance to the entry or emergence of hydrogen has been substantially reduced by a corrosion resistant coating having a high permeability to hydrogen.

BACKGROUND OF THE INVENTION

The separation and purification of hydrogen is practiced in a wide range of industrial applications. Typical applications include the cracking of ammonia and the subsequent separation of hydrogen from nitrogen using a hydrogen permeable membrane, the diffusion and collection of tritium from a fusion reactor and the removal of hydrogen from sodium in a nuclear reactor by the use of a cold trap.

A large number of physical and chemical hydrogen separation methods have been devised varying substantially in principle and in physical form. However, many are based on the use of some material in which hydrogen is very soluble or permeable or both.

Heretofore, one of the most attractive techniques for separating hydrogen from other gases involves the use of a heated membrane of palladium. Palladium is highly permeable to hydrogen but not to other gases so that a separation and purification can be effected by applying a pressure difference across the membrane and collecting pure hydrogen on the low pressure side. James B. Hunter describes such a process in U.S. Pat. No. 2,773,561. The high cost and low mechanical strength of palladium has resulted in many attempts to provide improved hydrogen permeable membranes. One such attempt is described by A.C. Markrides et al in U.S. Pat. No. 3,350,846. In this invention the high hydrogen permeability of Group V-B metals was recognized. The reason why these metals are impractical for use in the pressence of oxidizing gases was observed to be the rapid formation of an oxide film on the membrane surface which acts as a barrier to hydrogen entry or evolution. This defect was overcome by coating the Group V-B metals with palladium to prevent the formation of the oxide film.

Although this invention provided some improvement in cost compared to palladium, the high density and difficult fabrication problems of the Group V-B metals limited their application for hydrogen separation. These coated metals had the same limitation as palladium when used to separate hydrogen from fluids which are corrosive to palladium such as sodium or lithium. A means for providing a corrosion resistant membrane for use in sodium or other alkali metals at high temperature was described in my U.S. Pat. No. 3,622,303. In this invention pure nickel was used as a corrosion resistant, hydrogen permeable membrane. To prevent oxidation of the nickel on the surface where the hydrogen emerged, a thin coating of palladium was applied, which also produced a catalytic oxidation pumping mechanism.

Although this invention provided a corrosion resistant, hydrogen permeable membrane, the permeation rate of hydrogen and the yield strength of nickel were relatively low so that the pressure vessel design specification could not easily be met.

Another technique which is widely practiced for the removal of hydrogen from other fluids is known as "gettering". When using this process a material is selected which has a greater affinity for hydrogen than that of the substance from which the hydrogen is to be removed. By inserting the gettering material into the fluid, hydrogen can be absorbed by the getter. U.S. Pat. No. 2,926,981 to V.L. Stout et al described such a getter, based on alloys of titanium and zirconium. Zirconium is present in this alloy in the range of 10 to 98 atomic percent. These alloys were not provided with a surface coating, so they also absorbed other gases, greatly reducing the rate and quantity of hydrogen absorbtion. These alloys were not stablized in the body centered cubic crystalline structure.

In British Pat. No. 963,548, July 8, 1964, Pool and Sinclair disclosed a coated getter for removing hydrogen from alkali metals. Their getter material consisted of zirconium coated with nickel or a nickel based alloy. Zirconium exists in the hexagonal close packed crystalline form, which has a relatively low hydrogen diffusion coefficient. Consequently, it was necessary for Pool and Sinclair to limit the thickness of the getter to a maximum of 0.050 inches in order to achieve a practical rate of hydrogen absorbtion.

The behavior of titanium-zirconium alloys when hydrogen diffuses in them has been the subject of numerous scientific studies. John J. DeLuccia reported in "Electrolytic Hydrogen in Beta Titanium" in the Navel Air Development Center Report No. 76207-30, July 10, 1976. DeLuccia was interested in the diffusivity of hydrogen at ambient temperature using an aqueous solution in an electrolytic cell to generate hydrogen. He allowed hydrogen to diffuse into a palladium coated body centered cubic alloy of titanium-zirconium consisting of 11.5% Mo, 6% Zr, 4.5% Sn, balance Ti. He showed that at 21° C. the palladium coating allowed hydrogen to diffuse into the alloy but that it accumulated in the body of the alloy in regions called "traps". The accumulated hydrogen caused catastrophic cracking and deformation. He found that part of this damage could be reversed upon heating or standing, but he did not attempt to diffuse hydrogen at higher temperatures to see if hydrogen trapping would persist in a heated alloy. The present invention is intended to overcome or at least mitigate the problems encountered with the prior art, as will become apparent as the description proceeds.

SUMMARY OF THE INVENTION

In order to accomplish the desired results, this invention provides, in one form thereof, new and improved process and apparatus for separating hydrogen from fluids by contacting them with a titanium alloy comprising of the order of about 13% by weight vanadium, of the order of about 11% by weight chromium, of the order of about 3% by weight aluminum, balance titanium stabilized in the body centered cubic crystalline form. The alloy has at least one clean surface coated with a metal or alloy based on a member of the class consisting of palladium, nickel, cobalt, iron, vanadium, niobium or tantalum, and allowing hydrogen to permeate the coated alloy at a temperature between about 100° C. and 500° C.

According to one aspect of the invention the aforementioned alloys, suitably coated with one or more of the aforementioned coating metals or alloys, is an improved hydrogen permeable membrane, with the advantages of high hydrogen permeability combined with good corrosion resistance, high yield strength and low density.

According to another aspect of the invention a coated alloy is provided which is useful for selectively absorbing hydrogen from corrosive fluids, air, inert gases or vacuum systems and storing the hydrogen within the coated alloy as dissolved hydrogen or as a hydride.

Additional objectives will become apparent as the description of the invention proceeds.

There has been outlined rather broadly the more important features of the invention in order that the detailed description thereof that follows may be better understood, and in order that the present contribution to the art may be better appreciated. There are, of course, additional features of the invention which will be described more fully hereinafter. Those skilled in the art will appreciate that the conception on which this disclosure is based may readily be utilized as the basis of the designing of other processes and apparatus for carrying out the purpose of this invention. It is important, therefore, that this disclosure be regarded as including such equivalent processes and apparatus as do not depart from the spirit and scope of the invention.

Several embodiments of the invention have been chosen for purposes of illustration and description, and are shown in the accompanying drawings forming a part of the specification.

DETAILED DESCRIPTION OF THE INVENTION

Figure 1:
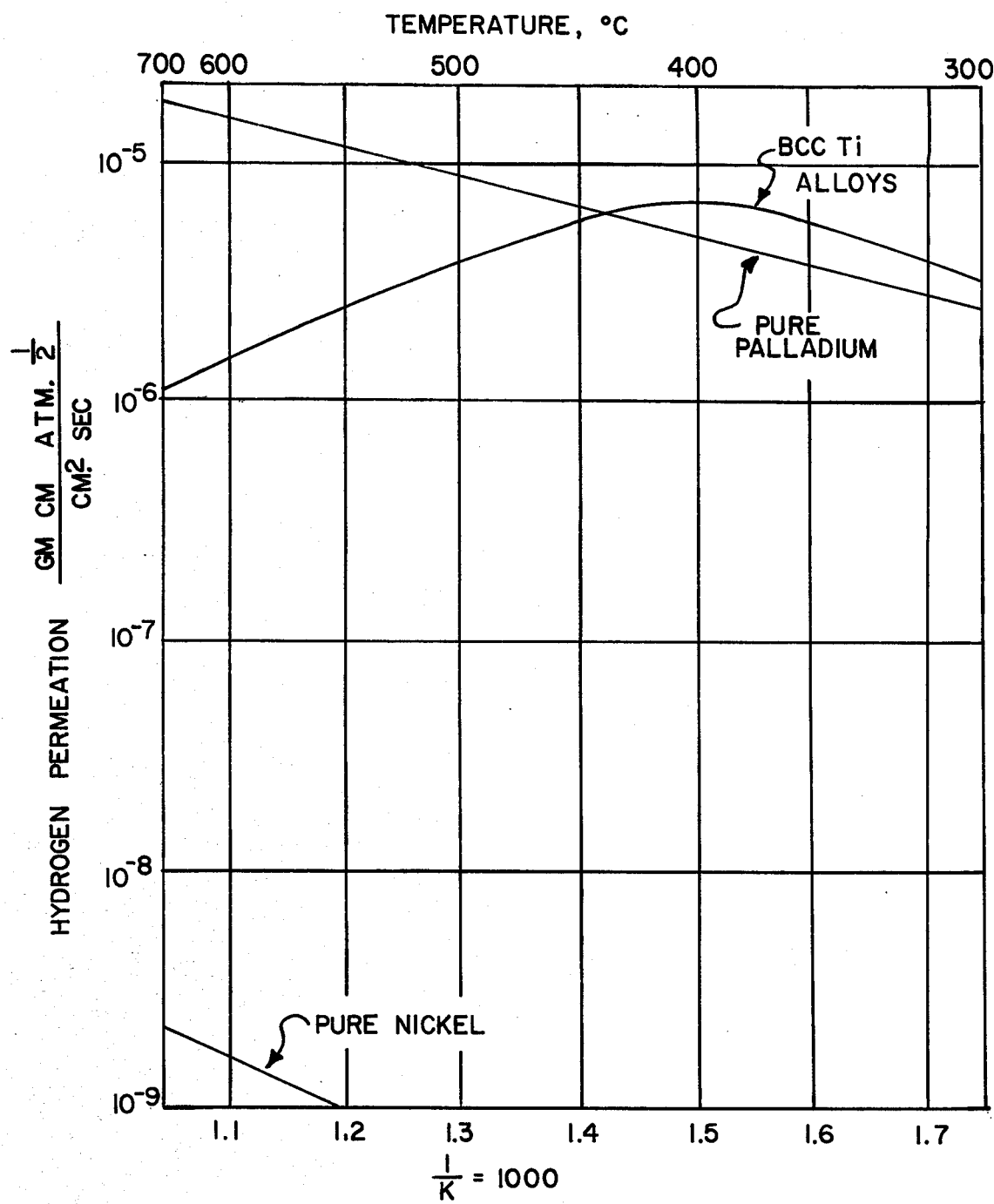
FIG. 1 is a graph showing the permeability of hydrogen for various materials as atmospheric pressure.

In its pure metallic state titanium exists in the hexagonal close packed crystalline form at room temperature, also known in the literature as the alpha form. When this element is heated to a high temperature, about 880° C., it undergoes a crystalline transformation to the BCC form. This metal will revert to the alpha form upon cooling below its transformation temperature unless certain elements are added which act as beta stabilizers. According to the present invention vanadium and chromium have been added as beta stabilizers.

The aluminum conveys improved metallurgical properties over a longer period of time at higher temperatures.

Impurities in concentrations typical of commercial alloys can be tolerated.

DESCRIPTION OF THE COATING

The entry of hydrogen into a metal, followed by permeation through the metal and finally the emergence of the hydrogen involves several sequential steps. At the entry surface the hydrogen must first be absorbed as a $H_2$ molecule, followed by disassociation into hydrogen atoms, then solution and diffusion through the metal. It follows the reverse process at the surface where it emerges. In this process the presence of holes, voids or pores in the metal is not required.

Except for the precious metals, such as palladium and its alloys, all metals can develop a surface impedance to the entry or emergence of hydrogen. Generally this impedance is an oxide film which must be removed and prevented from re-forming in order to achieve the hydrogen permeation rate inherent in a number of metals and alloys.

The inherently high hydrogen permeability of the beta titanium alloys of this invention is preserved by first removing the surface impedance and without allowing it to re-form, applying a thin coating of a metal selected from the class of elements having high hydrogen permeability and whose oxide is unstable in contact with the fluid from which the hydrogen is to be removed.

The thickness of the coating required is regulated by two factors, the inter-diffusion rate of the coating and the alloy and the corrosion rate of the coating in the hydrogen containing medium. The coating thickness must exceed the depth of combined corrosion and diffusion at the application. Since the hydrogen permeation rate of all the desirable coating metals except palladium is substantially lower than that of the titanium BCC alloys it is important to limit the coating thickness to the minimum value required for the required service life of a removal device.

Based on the corrosion and diffusion rates experienced in practical hydrogen separation processes, a range of coating thickness between about 0.1 and about 1.5 microns (a micron is $1 \times 10^{31\ 6}$ meter) is suitable. The choice of coating material requires a knowledge of the corrosion and poisoning behavior of the substance from which the hydrogen is to be separated. For example, if hydrogen is to be separated from air or inert gas, palladium is generally used for coating. For hydrogen removal from sodium, nickel or stainless stell would provide a suitable coating and for lithium, niobium or tantalum could be used.

MANUFACTURE OF THE INVENTION

One titanium BCC alloy suitable for use in practicing this invention is the commercial titanium alloy called VC120, comprising 13% vanadium, 11% chromium, 3% aluminum, balance titanium, all percentages by weight. This alloy has a yield strength of 140,000 pounds per square inch at room temperature, over ten times that of palladium, and its density is about 5.0 grams per cubic centimeter, compared to 12.2 for palladium. When used in the form of a membrane this alloy has a substantial advantage over palladium because less material is required due to its low density and a thinner membrane can be used to withstand a given pressure differential due to its high yield strength.

The quantitative performance of these coated alloys in separating hydrogen from fluids, solids and in vacuum can be described by equations for the solubility, diffusion coefficient and hydrogen equilibrium pressure in the composite coated alloy. Since a range of alloys and coating thicknesses can be used in practicing this invention, only approximate values for the above parameters can be given, without in any way limiting the performance of these materials to the values given. Equivalent values for conventional materials are also given for purposes of comparison.

For beta stabilized alloys of this invention the diffusion coefficient can be approximated as, $$D = 1.6 \times 10^{31.3} \exp{-2600/K}, \text{ cm}^2/\text{sec},$$

where D is the diffusion coefficient and K is the absolute Kelvin temperature.

For comparison the diffusion coefficient for alpha titanium is, $$D = 3.0 \times 10^{-2} \exp{-7350/K},$$

and for pure palladium, $$D = 4.3 \times 10^{-3} \exp{-2810/K},$$

and for nickel, $$D = 5.22 \times 10^{-3} \exp{-4780/K}.$$

At 400° C., (673K), the diffusion rate for the BCC titanium alloy is $3.6 \times 10^{-5}$; for alpha titanium $5.4 \times 10^{-7}$, for palladium $6.6 \times 10^{-5}$ and for nickel, $4.3 \times 10^{-6}$, all in cm$^2$/second. The solubility and equilibrium pressure of hydrogen in the beta stabilized alloys of this invention is approximated by the expression, $$\log\left(\frac{C}{\sqrt{P}}\right) = 0.14 + \frac{3000}{K} \text{ where}$$

C = hydrogen concentration in parts per million by weight,
P = equilibrium pressure of hydrogen in millimeters of mercury,
K = temperature in degrees Kelvin.

For alpha titanium the equivalent expression is:

$$\log\left(\frac{C}{\sqrt{P}}\right) = 0.001 + \frac{2750}{K}$$

When using materials as getters, they are evaluated for effectiveness by measuring the equilibrium pressure of hydrogen they are capable of attaining at a given hydrogen concentration. The lower the hydrogen pressure the better the getter.

At 400° C. the equilibrium pressure of hydrogen attainable with the beta alloys of this invention at a hydrogen concentration of 100 parts per million is $1 \times 10^{-5}$ millimeters of mercury. Under the same conditions the hexagonal close packed alpha titanium can attain a pressure of $7 \times 10^{-5}$ mm. Hg., seven times higher than the beta alloys.

Since permeation rate is obtained by multiplying the diffusion coefficient by the solubility, it can be seen that the BCC alloys are over 1000 times better than unmodified alpha titanium. They are about equal to palladium in hydrogen permeability, but their high tensile strength, low density and low cost gives them a substantial advantage over palladium, the best diffusion membrane known heretofor. Some permeability values over a wide temperature range are shown in FIG. 1, where palladium, nickel and the alloys of this invention are compared. Up to 425° C. these alloys are superior to palladium even without considering cost, density or yield strength.

When palladium is used as a coating metal, no appreciable reduction in hydrogen permeation is caused by the coating. However, when it is necessary to use other metals or alloys as coating, a reduction in hydrogen permeation rate must be expected. The permeation curve for nickel in FIG. 1 shows that a 0.5 micron coating of nickel on a BCC titanium alloy 250 microns thick will cause about 33% reduction in the hydrogen permeation rate. Thus, the thinnest possible coating, consistent with corrosion rate and inter-diffusion rate is recommended.

The coating metals or alloys can be applied by a number of techniques well known to those skilled in the art, but it is essential that the surface of the alloy be properly cleaned before the application of the coating. Any previously formed oxide film or other surface hindrance to the entry or emergence of hydrogen must first be removed. This impedance can be removed by outgassing at high temperatures, ion sputtering in a high voltage glow discharge or by chemical techniques.

Outgassing may be performed in a high vacuum (approximately $1 \times 10^{-6}$ to $1 \times 10^{-10}$ mm of Hg.) at 1000° C. The impedance may be removed by sputtering at a voltage of 2 to 4 thousand volts in a low pressure glow discharge of an inert gas such as argon. A suitable chemical method is to treat the surface of the alloy with a solution consisting of 5 to 10% HF in glacial acetic acid to 120° F. by anodically etching it for 10 to 20 minutes. The cleaned beta alloy beta alloy must now be protected against the formation of a new surface film until the selected coating material is applied. The selected coating material can be applied by well known vapor deposition, ion plating, glow discharge sputtering, electrochemical or electroless chemical plating techniques. The method chosen will be governed by the required corrosion and inter-diffusion resistance for a given application. After coating the coated alloy can be handled in air without any detrimental effects. These coated alloys can be formed, joined and machined by conventional methods.

APPLICATION OF THE INVENTION

A number of applications involving hydrogen removal, purification and separation from other fluids will be apparent to those skilled in the art. Some examples of specific applications follow.

Figures 2, 3:
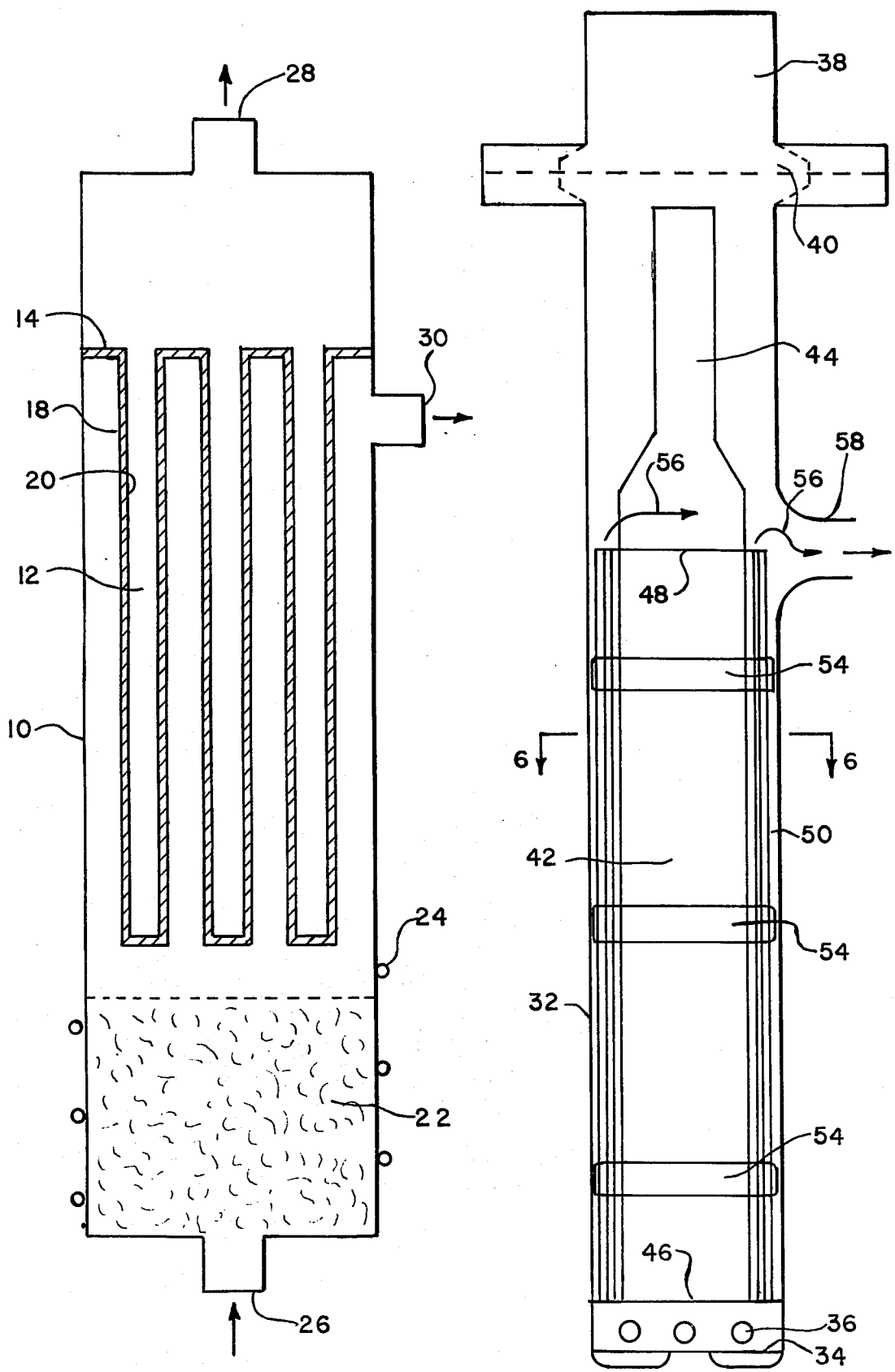
FIG. 2 is a medial sectional schematic diagram of a membrane system according to one form of the present invention.
FIG. 3 is a medial sectional schematic diagram of a getter system according to another form of the invention.

Referring to FIG. 2, there is shown a membrane system for removing hydrogen from a fluid. Mounted in a pressure vessel 10 are a plurality of membranes in the form of tubes 12 depending downwardly form a header plate 14. The tubes are plugged or capped at the bottom 16. The tubes, header plate and plugs are fabricated from the VC120 titanium alloy stablized in the body centered cubic crystalline form, and coated either on the outside 18 or inside 20 or on both sides with corrosion resistant coatings having a high permeability to hydrogen. The base portion of the vessel 10 is filled with steel wool 22 and a heating coil 24 is mounted thereabout. In operation, the impure fluid enters through an inlet 26 at the base of the vessel and flows upwardly therethrough. The hydrogen passes through the walls of the tubes 12 to a pure hydrogen outlet 28 at the top of the vessel. The so purified fluid leaves the vessel through an outlet 30 on the vessel sidewall disposed adjacent the header 14.

In using the coated alloy as a hydrogen permeable membrane, as shown in FIG. 2, the thickness of both the alloy and coating should be minimized. Generally the thickness of the membrane is kept in the range of 0.001 to 0.020 inch, and the coating, which would generally be palladium, is generally 0.1 to 0.5 microns thick. A desirable operating temperature range is 150° C. to 400° C. With an alloy membrane 0.010 inch thick with a 0.5 micron coating of palladium, its performance is similar to that shown in FIG. 1. The palladium coating has about the same hydrogen permeability as the membrane alloy so it does not materially change the alloy performance.

If palladium poisoning is a problem and free oxygen is not present in the substance from which the hydrogen is to be separated, one of the other metals or alloys disclosed in this invention may be used. Vanadium, niobium or tantalum are useful as a coating when separating hydrogen from unsaturated hydrocarbons which poison palladium.

Figure 4:
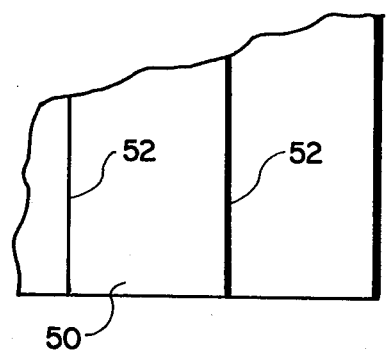
FIG. 4 is an enlarged fragmentary view of the coated, titanium alloy sheet getter element prior to being spirally wrapped around the mandrel.
Figure 5:
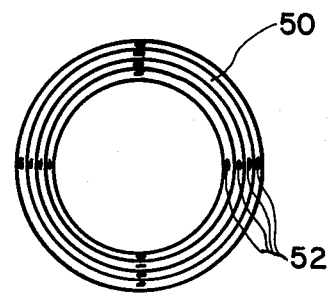
FIG. 5 is a transverse sectional view of the apparatus taken along the line indicated at 6—6 in FIG. 3.

Referring to FIGS. 3, 4 and 5, there is shown a getter system for removing hydrogen from a fluid. A pipe 32 is sealed at its lower end as by means of a cap 34, and a plurality of radially directed apertures 36 serve as an inlet for the impure fluid. The top of the pipe 32 is closed by a cap flange 38 which is removably sealed to the pipe as by means of a single seal coupling 40.

A mandrel 42 is positioned centrally in the pipe 32 by means of a lifting hook 44 at the top thereof. The mandrel is plugged at the bottom 46 and at the top 48 and filled with an inert gas such as argon, for example. Wrapped around the mandrel 42 in a spiral fashion is a coated, titanium VC120 alloy sheet 50 serving as a getter. The alloy is stabilized in its body centered cubic crystalline form. To keep the layers of the spiral sheet 50 spaced apart, vertically extending spacers 52 are provided, as best shown in FIGS. 4 and 5. The sheet 50 is encompassed by spaced circumferential bands 54.

In operation, the impure fluid enters through the apertures 36 and flows upwardly through the vertically extending annular channels formed between the layers of the alloy sheet 50 and out through the top thereof, as indicated by arrows 56, and thence out through the radial outlet 58 located at the upper end of the sheet 50. The hydrogen is absorbed in the getter sheet 50, which periodically can be removed through the upper end of the pipe 32 by removal of the cap flange 38.

For example, when removing hydrogen from sodium, the pipe 32 may be about 3 inches in diameter and the mandrel 42 may be about 2 inches in diameter. The alloy sheet or getter 50 may be about 0.009 inches thick with a height of about 12 inches. The sheet 50 is wrapped around the mandrel 42 three turns in a spiral manner. The spacers 52 are semi-circular, 0.11 inches deep and have a 0.125 inch diameter circle. There are six sodium inlet flow apertures 36, each being 13/32 inches in diameter. Hydrogen separation from a corrosive fluid was evaluated by removing hydrogen from sodium metal at temperatures ranging from 315° C. to 425° C. As examples, two methods of removal were evaluated, a getter technique, as shown in FIGS. 3 to 5, in which the hydrogen was absorbed by the coated alloy and retained in it in a semi-permanent form and by a permeable membrane technique, as shown in FIG. 2, in which the hydrogen entered one side of a coated membrane an was removed on the other.

When using the getter system, as shown in FIGS. 3 to 5, an alloy of titanium containing 13% vanadium, 11% chromium and 3% aluminum was coated with 0.5 microns of pure nickel using a glow discharge pre-coating cleaning technique in an argon atmosphere, followed by sputter coating. The coated alloy was immersed in sodium containing a known amount of hydrogen and its removal was followed using an ion pump type hydrogen monitor. The alloy was able to reduce the hydrogen pressure over the sodium to $1 \times 10^{-3}$ millimeters of Hg which is equivalent to a residual concentration of 0.15 parts per million by weight, leaving the sodium pure enough for use in a nuclear reactor.

In the membrane system, as shown in FIG. 2, the permeable membrane was made of the same alloy, also 0.010 inch thick, coated on the side 18 exposed to sodium with pure nickel 0.5 microns thick and on the other side 20 where hydrogen was removed with palladium also 0.5 microns thick. A differential pressure across the membrane was created by oxidizing the hydrogen to water at the palladium surface and in this case the palladium acted as an oxidation catalyst. The membrane was about equally effective as the getter, approaching the same residual pressure, the rate of removal being limited by hydrogen diffusion in the sodium and not in the membrane.

Membranes described in this invention are especially useful in separating tritium from facuum gaseous enclosures in fusion reactors and high energy particle accelerators and can be used to store tritium when used as a getter alloy.

Other applications include purification of inert gases, separation of a hydrogen carrier gas in a gas chromatograph, hydrogen storage in a hydrogen energy application, purification of electrolytic hydrogen, and separation of hydrogen from chlorine cell and reformer offgas. Another important application is the use of a platinum coated titanium alloy of the class disclosed in this invention to replace platinum and platinum alloys as electrodes in power cells and batteries.

Although certain particular embodiments of the invention are herein disclosed for purpose of explanation, various modifications thereof, after study of this specification, will be apparent to those skilled in the art to which this invention pertains.

What is claimed is:

1. A process for separating hydrogen from other fluids by contacting said fluids with a titanium alloy comprising of the order of about 13% by weight vanadium, of the order of about 11% by weight chromium, or the order of about 3% by weight aluminum, balance titanium, stabilized in the body centered cubic crystalline form, said alloy having at least one clean surface coated with a metal or alloy based on a member of the class consisting of palladium, nickel, cobalt, iron, vanadium, niobium or tantalum, and allowing hydrogen to permeate the coated alloy at a temperature between about 100° C. and about 500° C.

2. A process of separating hydrogen from other fluids according to claim 1 wherein said one clean surface has been coated with a metal or alloy based on nickel, cobalt or iron, said coating having a thickness between about 0.1 and about 1.5 microns.

3. The process according to claim 1 wherein said one clean surface coated with a metal or alloy is formed by the steps of high temperature outgassing followed by evaporative coating.

4. The process according to claim 1 wherein said one clean surface coated with a metal or alloy is formed by the steps of high temperature outgassing followed by ion coating.

5. The process according to claim 1 wherein said one clean surface coated with a metal or alloy is formed by the steps of electrochemical processing.

6. The process according to claim 1 wherein said one clean surface coated with a metal or alloy is formed by the steps of anodically etching the alloy in from about 5% to about 10% by weight of HF dissolved in glacial acetic acid at about 120° F., followed by an electroless plating process.

7. The process according to claim 1 wherein said step of allowing hydrogen to permeate the coated alloy is effected in a vacuum enclosure.

8. A process of separating hydrogen from other fluids according to claim 1 wherein said other fluids is a gaseous mixture and wherein a thin coating of palladium has been applied to the clean surface.

9. A process of separating hydrogen from other fluids according to claim 1 wherein said other fluids is a gaseous mixture and wherein said clean surface has been cleaned by glow discharge sputtering in an inert gas and without exposure sputter coated with palladium, said coating having a thickness of less than about 1.5 microns.

10. A process of separating hydrogen from other fluids according to claim 1 wherein said other fluids is a liquid alkali metal and wherein said clean surface is coated with a metal or alloy based on nickel, cobalt, iron, vanadium, niobium or tantalum.

11. A process of separating hydrogen from other fluids according to claim 1 wherein said other fluids is liquid sodium and wherein said one clean surface is coated with a metal or alloy based on nickel, cobalt or iron.

12. A process of removing hydrogen from liquid sodium by contacting said liquid sodium with a titanium alloy comprising of the order of about 13% by weight vanadium, of the order of about 11% by weight chromium, of the order of about 3% by weight aluminum, balance titanium, stabilized in the body centered cubic crystalline form, whose impedance on the clean surface has been removed by sputtering in a high voltage glow discharge of an inert gas, and without allowing it to re-form, coating the surface exposed to sodium with 1.5 microns or less of nickel and coating the surface where the hydrogen emerges with 1.0 micron or less of palladium, and allowing hydrogen to permeate the coated alloy at a temperature between about 100° C. and about 500° C.

13. A process of separating tritium from molten lithium by contacting said molten lithium with a titanium alloy comprising of the order of about 13% by weight vanadium, of the order of about 11% by weight chromium, of the order of about 3% by weight aluminum, balance titanium, stabilized in the body centered cubic crystalline form, wherein the alloy's surfaces have been cleaned to remove surface impedances to tritium permeation, and with a thin coating of niobium or tantalum or their alloys applied to the surface exposed to lithium and a thin coating of palladium applied to the surface where the tritium emerges, and allowing tritium to permeate the coated alloy at a temperature between about 100° C. and about 500° C.

14. Apparatus for separating hydrogen from other fluids comprising:
an element fabricated from a titanium alloy comprising of the order of about 13% by weight vanadium, of the order of about 11% by weight chromium, of the order of about 3% by weight aluminum, balance titanium, stabilized in a body centered cubic crystalline form, said element having at least one clean surface coated with a metal or alloy based on a member of the class consisting of palladium, nickel, cobalt, iron, vanadium, niobium or tantalum;
means for heating said element to a temperature of from about 100° C. to about 500° C.; and
means for bringing the hydrogen containing fluid into contact with said coated element to allow said hydrogen to permeate the coated alloy.

15. Apparatus for separating hydrogen from other fluids according to claim 14 wherein said other fluids is a gaseous mixture and wherein said clean surface is coated with a thin coating of palladium.

16. Apparatus according to claim 14 whose surface has been cleaned by glow discharge sputtering in an inert gas and without exposure sputter coated with palladium, said coating having a thickness of less than about 1.5 microns.

17. Apparatus for separating hydrogen from other fluids according to claim 14 further comprising a pressure vessel, a plurality of said elements in the form of tubes mounted in said pressure vessel and depending downwardly from a header plate, said tubes being closed at the lower ends thereof, said vessel having an inlet for the impure fluid towards the bottom thereof and an outlet for the pure hydrogen towards the top thereof above said header and an outlet for the purified fluid on the sidewall below the header.

18. Apparatus for separating hydrogen from other fluids according to claim 14 wherein said element is in the form of a sheet and further comprising a pipe sealed at its lower end and having at least one aperture serving as an inlet for impure fluid at the lower end thereof, removable sealing means at the top of said pipe, a mandrel positioned centrally in the pipe, said mandrel being sealed and filled with an inert gas, said sheet being wrapped around said mandrel in a spiral fashion, the layers of said sheet being separated by spacer means, and said pipe having an outlet towards the upper end thereof for purified fluid.

19. Apparatus for separating tritium from molten lithium comprising: an element fabricated from a titanium alloy comprising of the order of about 13% by weight vanadium, of the order of about 11% by weight chromium, of the order of about 3% by weight aluminum, balance titanium, stabilized in a body centered cubic crystalline form, wherein the surfaces of said element are cleaned to remove surface impedance to tritium permeation, and a thin coating of niobium or tantalum or their alloys applied to the surface exposed to lithium and a thin coating of palladium applied to the surface where tritium emerges, means for heating said element to a temperature of from about 100° C. to about 500° C.; and means for bringing the tritium into contact with said coated element to allow said tritium to permeate the coated alloy.

* * * * *

UNITED STATES PATENT OFFICE
CERTIFICATE OF CORRECTION

Patent No. 4,468,235　　　　　　　　　Dated Aug. 28, 1984

Inventor(s)　Eugene F. Hill

It is certified that error appears in the above-identified patent and that said Letters Patent are hereby corrected as shown below:

Column 4, line 47, delete "$1 \times 10^{316}$ meter" and insert in place thereof -- $1 \times 10^{-6}$ meter --.

Column 5, line 16, delete "$1.6 \times 10^{313}$ exp" and insert in place thereof -- $1.6 \times 10^{-3}$ exp --.

Column 8, line 35, delete "facuum" and insert in place thereof --vacuum --.

Column 8, line 58, delete "or" and insert in place thereof --of --.

Signed and Sealed this

Twenty-third Day of April 1985

[SEAL]

Attest:

DONALD J. QUIGG

Attesting Officer　　Acting Commissioner of Patents and Trademarks